US012529619B2

(12) United States Patent
Knuelle

(10) Patent No.: US 12,529,619 B2
(45) Date of Patent: Jan. 20, 2026

(54) DEVICE AND SYSTEM FOR A LEAK TEST OF A CONTAINER AND METHOD FOR SAME

(71) Applicant: Koerber Pharma Inspection GmbH, Markt Schwaben (DE)

(72) Inventor: Matthias Knuelle, Assling / OT Loitersdorf (DE)

(73) Assignee: KOERBER PHARMA INSPECTION GMBH, Markt Schwaben (DE)

(*) Notice: Subject to any disclaimer, the term of this patent is extended or adjusted under 35 U.S.C. 154(b) by 325 days.

(21) Appl. No.: 18/062,458

(22) Filed: Dec. 6, 2022

(65) Prior Publication Data
US 2023/0184615 A1 Jun. 15, 2023

(30) Foreign Application Priority Data
Dec. 15, 2021 (DE) ............... 10 2021 133 158.7

(51) Int. Cl.
G01M 3/18 (2006.01)
(52) U.S. Cl.
CPC .................. G01M 3/186 (2013.01)
(58) Field of Classification Search
CPC .......... G01M 3/16; G01M 3/18; G01M 3/186; G01M 3/32; G01M 3/3209; G01M 3/40
See application file for complete search history.

(56) References Cited

U.S. PATENT DOCUMENTS

| 4,125,805 | A | * | 11/1978 | Nagamatsu ............ G01N 27/60 324/558 |
| 4,243,932 | A | | 1/1981 | Kakumoto et al. |
| 2013/0318917 | A1 | * | 12/2013 | Nilsson ............... G01M 3/3281 73/49.3 |
| 2019/0376873 | A1 | * | 12/2019 | Bekhtur ................ G01M 3/40 |
| 2021/0072112 | A1 | | 3/2021 | Bekhtur et al. |

FOREIGN PATENT DOCUMENTS

| DE | 2715399 | A1 | | 1/1978 | |
| DE | 19548177 | A1 | | 6/1997 | |
| DE | 19845990 | A1 | | 1/2000 | |
| DE | 19914658 | A1 | * | 11/2000 | ........... E04D 13/006 |
| JP | S59195140 | A | | 11/1984 | |

* cited by examiner

Primary Examiner — Benjamin R Schmitt
(74) Attorney, Agent, or Firm — McCoy Russell LLP

(57) ABSTRACT

The present invention relates to a device for a leak test of a container comprising a first electrode; a second electrode that is arranged spaced apart from the first electrode so that a space for the arrangement of the container is provided between the electrodes; a power supply that is adapted to apply a voltage between the first electrode and the second electrode; and at least one analysis unit that is adapted to analyze a current and/or voltage progression that is adopted on a presence of a container to be tested for its leak tightness between the first electrode and the second electrode to detect a leak tight or a leaking container. The power supply is adapted to apply a DC voltage between the first electrode and the second electrode, including a high voltage DC voltage that is in the range from 500 V to 50 kV.

17 Claims, 16 Drawing Sheets

1

DEVICE AND SYSTEM FOR A LEAK TEST OF A CONTAINER AND METHOD FOR SAME

CROSS REFERENCE TO RELATED APPLICATION

The present application claims priority to German Patent Application No. 10 2021 133 158.7 filed on Dec. 15, 2021. The entire contents of the above-listed application are hereby incorporated by reference for all purposes.

TECHNICAL FIELD

The present invention relates to a device and a system for a leak test of a container and to a method for same.

BACKGROUND

Leak tests of glass and plastic containers having a liquid content are carried out inter alia using electric fields of high field strength (in the range from 250 to 1500 V/m). The field electrodes required for this purpose are usually designed such that an inhomogeneous field is generated so that the field strengths can adopt even higher values locally at the container.

If a leaking container passes through the E-field and if the leak is in the range of high field strength, a change of the current flow occurs up to a sparkover between the two electrodes. This change in the current flow is measured and serves as evidence of a leak site.

SUMMARY

It is known from the prior art to use an alternating voltage for this purpose whose frequency is typically higher by a multiple than the mains frequency.

To ensure that a defect is reliably found over the total periphery of the container independently of its position at the container, the frequency must be so high with an alternating voltage that every location on the typically rotating container sees the full amplitude of the field at least once. 50 Hz (mains frequency) is not sufficient for this purpose with the machine speeds usual today. The frequencies are typically at 500 Hz and more. This produces substantially higher displacement currents (with a given capacitance, they are proportional to the frequency).

It is disadvantageous with a leak test making use of alternating voltage that transformers are required to generate the voltage used in this process that take up space with respect to the required construction space and that are also expensive.

The high displacement currents moreover make the use of shielded cables impossible since they would in time destroy the insulator material (e.g. due to the heat development). I.e. non-shielded lines are used to feed the electrodes that require corresponding high distances from the environment and again have a negative effect on the construction space taken up.

All the insulators around the cable moreover have to have corresponding thicknesses to ensure sufficient protection from sparkover and to sufficiently reduce the displacement currents. Creeping currents and displacement currents against ground potential can otherwise attack the materials too much and destroy them over time. The plastic parts required for this purpose have to be individually produced (high costs) and require a lot of space.

Depending on the conductivity of the liquid present in the containers, alternating currents can also occur there. This is in particular seen as highly disadvantageous with respect to very sensitive liquids stored in the containers.

It is a further disadvantage that with applied AC voltages, the sensor is only sensitive when the amount of the voltage is sufficiently high. No defects can be detected at the container in the range of zero crossings. If a specific field direction is preferred for the detection (this is generally the case with the asymmetrical, inhomogeneous fields that are used as a rule), a complete half wave is additionally missing in time so that the sensor only has the ideal sensitivity and is able to detect a leak during a portion of the measurement time.

In leak tests with alternating voltage, filters or measurement bridges are also used that smooth the current signal—adapted to the frequency of the alternating voltage—to be able to detect leaking containers via simple threshold value measurements. To obtain a sufficient measured value interval between non-leaking and leaking containers in this manner, the voltage amplitudes have to be selected as so high that lightning discharges and thus high current increases occur as a rule (not in general) at the leaks.

If more complex evaluation processes are to be used, the analysis of the data is made more difficult in that the desired signal is superposed by a distinct displacement current whose frequency reflects the progression of the AC voltage. This "background" has to be determined and deducted from the measured signal.

Exemplary implementations of a detection of leaks of a container using alternating voltages can be found in DE 19 548 177 A1 or U.S. Pat. No. 4,243,932.

It is the aim of the present invention to overcome or at least to alleviate the disadvantages listed above, which succeeds using a device that includes all the features of claim 1, using a system in accordance with claim 7, or a method in accordance with claim 11.

In accordance with the invention, a device for a leak test of a container is claimed that comprises a first electrode; a second electrode that is arranged spaced apart from the first electrode so that a space for the arrangement of the container is provided between the electrodes; a power supply that is adapted to apply a voltage between the first electrode and the second electrode; and at least one analysis unit that is adapted to analyze a current and/or voltage progression that is adopted on a presence of a container to be tested for its leak tightness between the first electrode and the second electrode to detect a leak tight or a leaking container on the basis thereof. The device in accordance with the invention is characterized in that the power supply is adapted to apply a DC voltage between the first electrode and the second electrode, preferably a high voltage DC voltage that is in the range from 500 V to 50 kV, preferably in the range from 5 kV to 40 kV, and very particularly preferably in the range from 8 kV to 36 kV.

The advantage of a use of DC voltage instead of the AC voltage typically used in the known prior art inter alia comprises no AC currents being able to be formed in the liquid held by the container.

The total time in which the container is located in the electric field formed by the two electrodes can furthermore be used for a subsequent analysis.

Unlike with the AC voltage, with DC voltage there are no sections in the region of the zero crossings of the voltage progression that have too small a field strength for an analysis. The measurement system remains continuously sensitive to defects on the product (no "dead times").

In addition, the insulation effort of the parts conducting high voltages is smaller in the implementation in accordance with the invention of the device since no or only very small displacement currents occur since the extremely high DC voltage resistances dominate with DC voltages. Shielded high voltage cables can thus be used, for example, and the insulation material is strained less since no displacement currents occur. This results in a substantially smaller strain and aging of the insulation materials (plastics as a rule).

There is also not the problem typical for AC systems according to which the measurement sensitivity at one half wave is smaller than at the other one in an embodiment of the two electrodes that results in an asymmetrical field distribution. A coordination of the rotational frequency of containers to be examined is furthermore also no longer necessary with respect to the frequency of the AC voltage since there are no voltage zero crossings in which no detection is possible. This problem was previously dealt with such that the rotation speed of the containers is not set too high since then holes are detected in a certain radius about the needle electrode tip. This problem no longer occurs with a DC system.

Provision can be made in accordance with a further optional development of the present invention that a device for rotating the container about an axis is provided between the first electrode and the second electrode in the space for the arrangement of the container so that the at least one analysis unit is able to analyze the current progression during a rotation of the container, preferably during at least one full rotation, in particular during at least two full rotations of the container.

On an analysis, a comparison of the obtained signal with respect to the periodicity of the container rotation is thus then also known so that abnormalities that always repeat and that have a relationship with the periodicity of the container rotation can be detected and, starting from this, a conclusion can be drawn on an irregularity or a leak of the container.

Provision can be made in accordance with a further development of the present invention that the first electrode or the second electrode are connected to one of the poles of the power supply via a measurement impedance or a measurement bridge, wherein the positive pole is preferably connected to the first electrode and the negative pole is preferably connected to the second electrode via a measurement impedance or a measurement bridge; and/or wherein the power supply is adapted to continuously maintain a DC voltage to be applied to the first electrode and to the second electrode, wherein the power supply is preferably adapted to continuously maintain the DC voltage over the test of the leak tightness of the container and in so doing in particular no further components are present for the variation of the electric field generated between the first electrode and the second electrode, for example switches, superposed alternating fields, or the like.

Provision can also be made that the measurement impedance is connected to ground by a first one of its connectors and to the first or second electrodes by the second one of its connectors.

The measurement impedance or the measurement bridge simplifies the tapping of a measured signal and thus represents a simple solution to obtain a desired current and/or voltage progression. It is in particular possible due to the continuous maintenance of the DC voltage to dispense with further additional components that carry out a switching on or a deactivation of the DC voltage.

Provision can be made in accordance with a further optional modification of the invention that the first electrode and/or the second electrode is/are configured such that an inhomogeneous and/or an asymmetrical electric field is formed between the first electrode and the second electrode to generate local field strengths at the container that adopt particularly high values on an insertion of a container between the two electrodes.

The term "inhomogeneous" here stands for a field whose amount and/or direction is/are not constant. The term "asymmetrical" describes a field whose "field lines" (field extent without sign) is not symmetrical to the plane that is spanned by the container axis and any container transport direction.

Alternatively or additionally to this, provision can be made that the electric field strength generated with the aid of the first electrode and the second electrode is in the range from 250-1500 V/mm, preferably in the range from 400-1000 V/mm.

Provision can furthermore also be made in accordance with the present invention that the first electrode and/or the second electrode is/are divided into at least two sections that are separated from one another to obtain a spatial resolution of any leak of the container, with each of the separated sections being conducted to the at least one analysis unit via a separate measurement channel, with the electrode divided into at least two separate sections preferably being that electrode whose current and/or voltage progression is conducted to the at least one analysis unit for the analyzing.

An example for such a spatially resolved detection is the distinction of leaks in the region of the cylindrical surfaces and in the neck/shoulder region of vials that are subject to different deformations in the course of the production from tubing glass. Due to the segmentation of the electrode, information is obtained on the point at which leaks in the container increasingly occur so that troubleshooting directed hereto can be started.

Provision can thus also be made in accordance with the invention that, starting from the measurement electrode, a plurality of measurement branches are provided for analyses running separately from one another.

Provision can be made in accordance with a further optional development of the invention that the analysis unit is adapted in response to any leak that may be present to focus on at least one characteristic pattern in the current and/or voltage progression to detect a leak in the examined container, with the at least one characteristic pattern of the current progression and/or voltage progression not been directed to the occurrence of a lightning discharge between the container and the first electrode or the second electrode, but rather to changes in the current progression with a substantially smaller average power.

Provision can thus be made, for example, that the analysis unit is adapted to use one or more of the following evaluation processes simultaneously or consecutively.

a. a pulse counting process, preferably with an amplitude and pulse width selection;
b. an interval selective integration of the current and/or voltage signal, for example to detect a sparkover current;
c. a pulse shape analysis, preferably with the aid of numerical processes such as a folding with different filter functions, a determination of the correlation with suitable model functions, and/or a calculation of the spectral function of the current and/or voltage signal with the aid of Fourier and/or wavelet transformation;
d. a correlation analysis between the positions of potential defects and the position of the container;
e. an examination of the periodicity of the current changes that occur in the cycle of a rotation of the container, with a calculation of the Fourier coefficients preferably taking place for the rotational frequency of the container and for a suitable number of whole multiples, in particular double this frequency, and/or with a regression analysis taking place that is based on a finite series of harmonics whose frequencies correspond to the rotational frequency of the container and to a suitable number of whole multiples, in particular the double, of this frequency;

f. a regression analysis with the aid of suitable model functions; and/or g. a recognition of irregular signal progressions with the aid of numerical processes or of a deep learning technology.

Such analysis processes can particularly be implemented substantially more easily with high DC voltages since the desired signal is not superposed by other signals. It is different with AC voltages: Here, a distinct displacement current, whose frequency reflects the progression of the AC voltage, superposes the desired signal. This "background" has to be determined (e.g. fitted) and deducted from the measured signal, which is not as accurate as desired.

In addition, dealing with high DC voltages is substantially simpler. Coaxial cables can e.g. thus be used so that every further insulation of the cables becomes superfluous. Complete HV power packs exist to generate the high DC voltage; no additional transformers are required.

To optimize the evaluation processes, a signal pre-processing can selectively be carried out via filters and correspondingly adapted amplifiers.

Provision can accordingly be made that a network of passive components is provided to adapt the impedance of the power supply to the electrode connected to the power supply. In the simplest case, the network composed of passive components (resistors, capacitors, inductors) can be a pre-resistor.

Provision can furthermore be made that the measurement impedance is a measurement bridge of passive components to fix the measurement range and the frequency characteristic. The measurement impedance can here additionally comprise components, such as TVS (suppressor) diodes, to protect the following measurement electrodes from too high a voltage.

An optional signal coupling and/or a filter for a signal preparation can equally also be provided before a supply of the signal to the analysis unit. An ohmic coupling or a capacitive coupling can be considered as a signal coupling, for example, with an inductive transducer also being able to be used, however. Provision can be made here that the signal coupling and/or the filter is/are connected to that electrode from which the measurement impedance also originates.

An amplifier can furthermore also be provided for amplification and/or for signal pre-processing. The amplifier here can comprise transistor circuits or differential amplifiers, for example, and serves to amplify the signal to be analyzed.

The analysis unit can comprise an analog-to-digital converter in accordance with an optional further development to digitally convert the signal that occurs as analog. The analysis unit can furthermore alternatively or additionally also have a processing unit for recording and for evaluating data and for transmitting results.

The invention further relates to a system for a leak test having a device in accordance with one of the preceding claims and having a container filled with a liquid, wherein the container is positioned between the first electrode and the second electrode during a test of its leak tightness such that it does not contact either the first electrode or the second electrode, preferably having a minimum distance from each of the electrodes of 0.2 to 5 mm (preferably of 2 mm, further preferably 4 mm, and very particularly preferably 5 mm).

The increased distance on the leading of the contains through the space between the first electrode and the second electrode enables a design that is subject to less strict mechanical tolerance demands. If, in contrast for example, the functionality of the system is only ensured when the two electrodes may only have a maximum distance from the container to be tested of 1 mm, the fast leading of a plurality of containers through the intermediate zone of the two electrodes can be implemented in a very much more demanding manner.

The system can furthermore be further provided with a conveying device for the container that is preferably adapted such that the dwell time of the container to be tested in the electric field that can be generated in the space between the first electrode and the second electrode is no longer than 1 second, preferably no longer than 0.5 seconds, and preferentially no longer than 0.05 seconds. The conveying device can be adapted to consecutively lead a plurality of containers through the space between the first electrode and the second electrode to examine each of the containers led through for any leak.

Provision can be made in accordance with an optional variation of the system that the container is filled with a liquid whose conductivity at 20° C. is in the range from 0.5 µS/cm to 20 mS/cm, preferably 2 µS/cm to 10 mS/cm, preferentially 5 µS/cm to 8 mS/cm, or whose conductivity at 20° C. is in the range of less than 5 µS/cm. It is accordingly not necessary that the container has to be filled with a conductive liquid since the present device or the present system also works with a non-conductive or very weakly conductive liquid.

Provision can further be made that the container is largely composed of a non-conductive or a weakly conductive material, for example of glass, ceramic materials, and/or is plastic, and/or a flask, a vial, an ampoule, a syringe (incl. needle and needle protection), a pouch, or a cartridge, and/or has a rotationally symmetrical shape.

The invention further relates to a method of a leak test a container, preferably using the device in accordance with one of the above-discussed variants or having a system in accordance with a preceding variant, wherein, in the method, a container is led through an electric field that is formed by a first electrode and a second electrode while applying a DC voltage, preferably a high voltage DC voltage, that is in the range from 500 V to 50 kV, preferably in the range from 10 kV to 50 kV, and very particularly preferably in the range from 25 kV to 50 kV, with a current and/or voltage progression at the first electrode and/or at the second electrode being analyzed to draw a conclusion on a leak tightness of the container, and with the container being rotated about its axis of rotation while it is in the electric field, for example at a rotation speed in the range from 500-4000 r.p.m., preferably 1000 to 3000 r.p.m., and more preferably 1200-2000 r.p.m.

Provision can furthermore be made that the container to be examined is introduced into the electric field in an electrically non-charged state. Provision is therefore accordingly not made that the container to be examined is electrically charged in a preceding step.

Provision can be made in the method in accordance with an optional further development of the invention that in the analysis of the container for any leak that may be present, at least one characteristic pattern in the current and/or voltage progression is focused on detecting a leak in the examined container, with the at least one characteristic pattern of the current progression and/or voltage progression preferably not being directed to the occurrence of a lightning discharge between the container and the first electrode or the second electrode, but rather to changes in the current and/or voltage progression with a substantially smaller average power.

Provision can preferably be made in the method in accordance with the invention that on the analysis of the container for any leak that may be present, the pulses above a threshold value in the current and/or voltage progression are looked at to be able to evaluate the leak tightness of the container with reference thereto, with an increased pulse rate in the current and/or voltage progression corresponding to the periodicity of the rotation of the container preferably being an indication of a leak in the container, and/or with a temporary lack of the pulses in the current and/or voltage progression being an indication of a leak in the container. Provision can further be made that only those pulses are looked at that are below a second threshold value.

A correlation of the current and/or voltage progression with a typical current and/or voltage progression is preferably calculated without a leak and/or with a leak in the analysis of the container to be able to draw a conclusion on a leak in the currently examined container with reference hereto and/or a focus is made on deviations in the current and/or voltage progression that occur in accordance with the periodicity of the rotation of the container and that occur over at least two rotation periods.

If the container rotates while it is in the electric field set up by the two electrodes, deviations can result in the current and/or voltage progression whose periodicity agrees with that of the rotation of the container or is in relation thereto (for example agrees with double the rotational frequency). They may be an indication of a leak in the container that is located at a specific point of the container.

Provision can furthermore be made that the current and/or voltage progression is transitioned into the Fourier spectrum in the analysis of the container, with a conclusion preferably being drawn on a leak of the container on an exceeding of a threshold value of an amplitude in the range of twice the rotational frequency of the container, and/or with the contributions of the Fourier coefficients being calculated for double the rotational frequency of the container and/or of a whole number multiple thereto, and with a conclusion being drawn on a leaking container on an exceeding of a threshold value of the contributions at these points.

Provision can be made here that the current progression to be analyzed comprises the introduction into the electric field, the dwelling, and the leading of the container out of the electric field.

The use of the Fourier transformation or also of a wavelet transformation is advantageous in the analysis and enables a very simple distinction between an intact and a leaking container under certain circumstances. If, for example, the focus is placed on the Fourier coefficients in the range of the rotational frequency or in the range of twice the rotational frequency, a significant difference results between intact containers and leaking containers that allows a simple threshold value analysis for the detection of leaks.

BRIEF DESCRIPTION OF THE FIGURES

Further features, details and advantages of the invention will become clear with reference to the following description of the Figures. There are shown.

DETAILED DESCRIPTION

Figure 1:
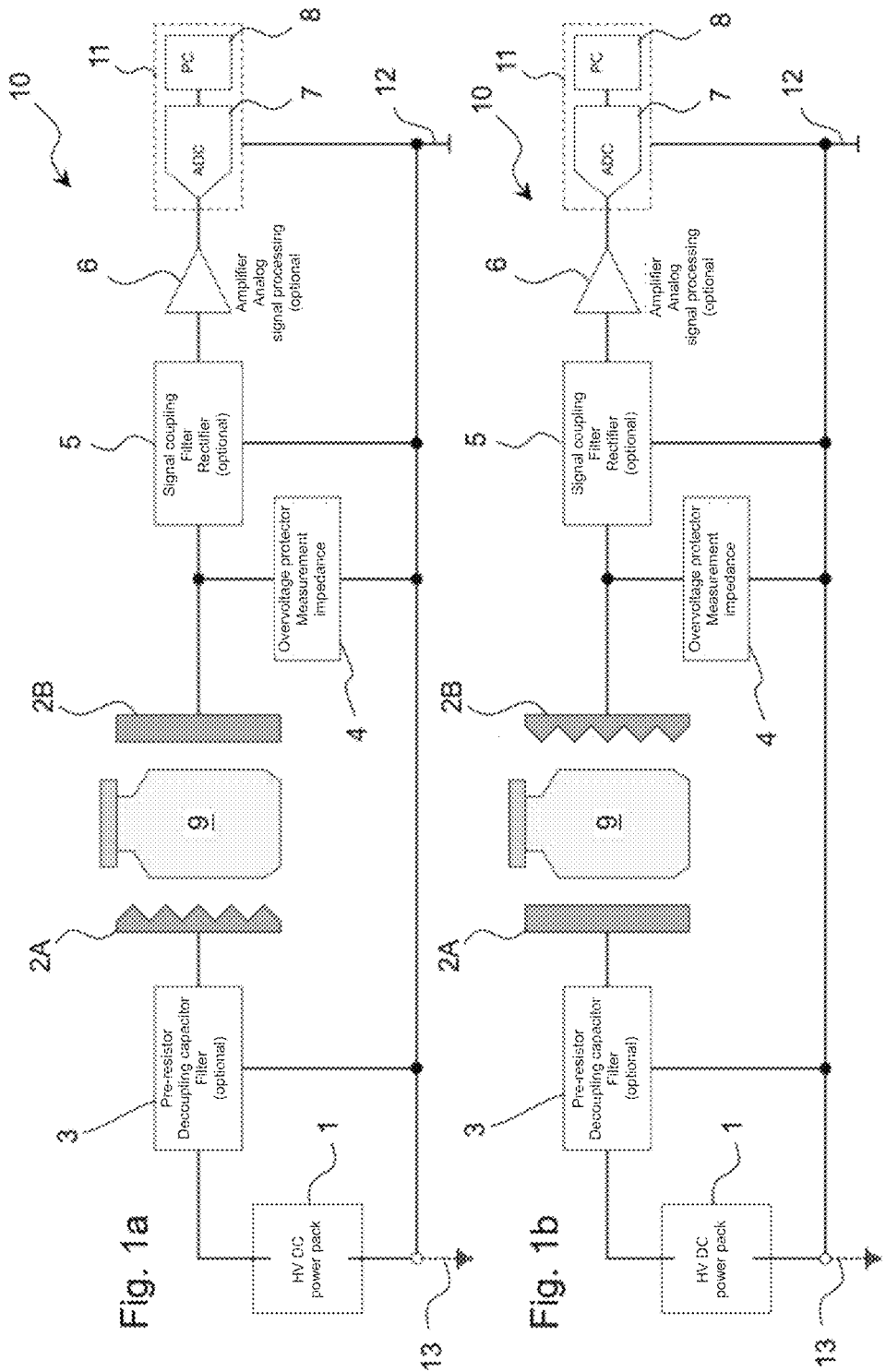
FIG. 1a: schematic representation of a device in accordance with the invention with a container to be examined.
FIG. 1b: a schematic representation of a device in accordance with the invention with a container to be examined.

FIG. 1a shows a block diagram of a system in accordance with the invention for a leak test using DC voltage.

The system 10 for the leak test comprises a power supply 1 for the provision of a DC voltage in the range from 500 V to 50 kV; a first electrode 2A and a second electrode 2B for generating an electric field; and a container 9 that is positioned between the first electrode 2A and the second electrode 2B and that is to be examined with respect to its leak tightness. The first electrode 2A is here connected to a first pole of the power supply 1 whereas the second electrode 2B is connected to the second pole of the power supply 1 via a measurement impedance 4. The second pole of the power supply can here be coupled to the ground 12 or also the ground 13 to obtain a constant reference level for the measurements.

The measurement impedance 4 can comprise a measurement resistor or a measurement bridge of passive components (resistors, capacitors, inductors) to fix the measurement range and the frequency characteristic of the signals obtained. Further components such as TVS diodes can furthermore also be provided to protect downstream electronic components from voltages of high amplitude.

The first electrode 2A can furthermore be connected to an optionally providable network 3 of passive components to carry out a suitable adaptation of the resistances from the power supply 1 to the first electrode 2A.

The second electrode 2B can likewise optionally be coupled to a signal coupling and/or to a filter 5 for a signal preparation. This signal coupling can comprise an ohmic or capacitive coupling and also an inductive transducer.

In addition, an amplifier unit to prepare the signals detected can be provided in series therewith on the side of the signal coupling and/or filter 5 remote from the second electrode 2B. This amplifier 6 can have transistor circuits, differential amplifiers, or the like.

The analysis unit 11 here comprises an analog-to-digital converter 7 that can be present, for example, in the form of a measuring board and a processing unit 8 to record data, to evaluate them, and to transmit the result derived therefrom to a corresponding position.

The chain of the analog signal processing—starting from the measurement impedance 4 up to and including the amplifier 6—is frequently combined under the term signal pre-processing.

The container 9 to be examined for its leak tightness is here arranged in the intermediate space that is formed by the distance of the first electrode 2A from the second electrode 2B. An electric field is formed in this region on the application of a voltage to the electrodes 2A/2B so that a conclusion can be drawn on the leak tightness of the container 9 on a corresponding analysis of the current and/or voltage progression at the measurement electrode 2B.

During the leak test the container 9 is located between the two electrodes 2A/2B between which the electric field has been generated by applying the voltage. The shape of the electrodes determines the field progression of the electric field. For this purpose, the high voltage electrode 2A is connected to a corresponding DC power supply 1 via an optional pre-resistor and an optional decoupling capacitor. The antipole of the power supply 1, for example a power pack, represents the reference potential (GND 12) and can generally be connected to ground potential 13 (protective ground).

The measurement electrode 2B can here be connected via a measurement bridge 4—comprising a measurement impedance (a measurement resistor in the simplest case) and an overvoltage protector that is likewise connected to the reference potential (GND) so that the circuit is closed via the power supply 1.

High field strengths (=potential gradients) can be applied to the high voltage electrode 2A by a corresponding shape of the electrodes (shown by the corrugated shape of the electrode 2A in FIG. 1*a*). This is alternatively also possible in the low voltage electrode.

The measured signal to be analyzed is tapped at the measurement electrode 2B, is pre-processed via an optional signal coupling, an optional filter (for example a low pass, high pass, bandpass, band-stop filter, and combinations of these basic types) and rectifiers and digitized and evaluated by the analysis unit 11 via a likewise optional pre-amplifier (transistor amplifier, differential amplifier, . . . ) with the additional option of a first signal processing (e.g. integrator).

This analysis unit 11 takes over the final evaluation of the data and makes the decision whether a leak is present. In this respect, different algorithms can be used in parallel to achieve an optimum result reliability.

The analysis unit 11 generally comprises an analog-to-digital converter 7 and a processing unit 8 that preferably control and monitor the total system via additional IO signals and interfaces and also provide the connection to control the system 10. It is clear to the skilled person that microcontroller modules having integrated AD converters can also be used instead of the processing unit 8 having a separate measuring board for data acquisition, with the possibilities of data analysis depending on the performance of the controllers.

Provision is furthermore made that the power supply 1 itself is not subject to any manipulation, e.g. a polarity reversal by separate switches or the like. No additional components suitable for high voltage are thus required.

FIG. 1*b* shows an identical design to FIG. 2*a* and only differs herefrom in that now the measurement electrode 2B—and not the HV electrode 2A as in FIG. 1*a*—is correspondingly shaped so that now the high field strengths are applied there.

Figure 2:
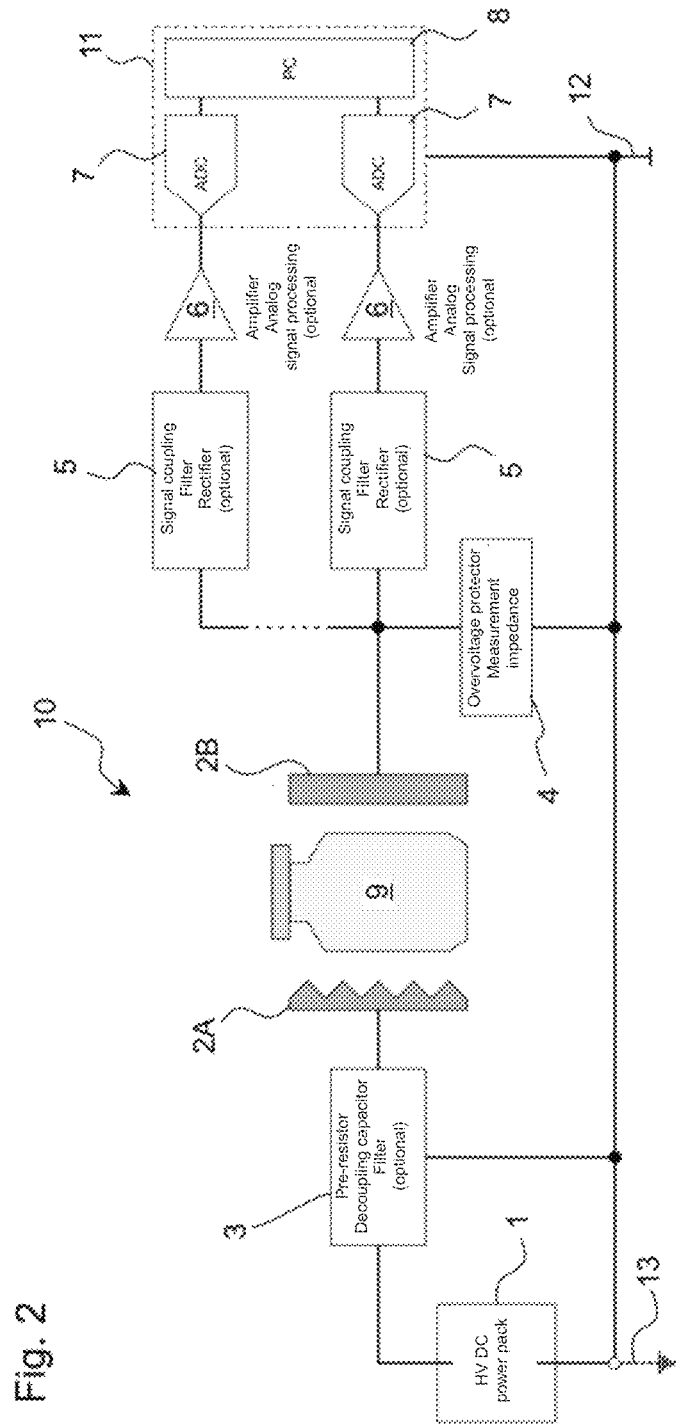
FIG. 2: a further schematic representation of a device in accordance with the invention in accordance with a further embodiment.

FIG. 2 shows a block diagram of a system in accordance with the invention in which the signals applied to the measurement electrode 2B are conducted to a correspondingly modified analysis unit 11 via a plurality of separate channels.

In very critical cases (i.e. with very small leaks and/or small conductivities of the container contents) the measured signal can be fed into a plurality of parallel processing channels to improve the inspection result, with their respective input resistances advantageously being sufficiently high. In this respect, all the optional components from the signal coupling 5 up to the amplifier 6 can be selected as different and alternative algorithms can be used for signal processing in the analysis unit 11 and the processing unit 8. The combination of these evaluations can then determine the result of the leak test.

This is of advantage since here different approaches can be used in the analysis of the measured data generated and a somewhat more general observation of the different analysis processes is subsequently possible so that a conclusion can be drawn on the correct result with a higher likelihood.

Figure 3:
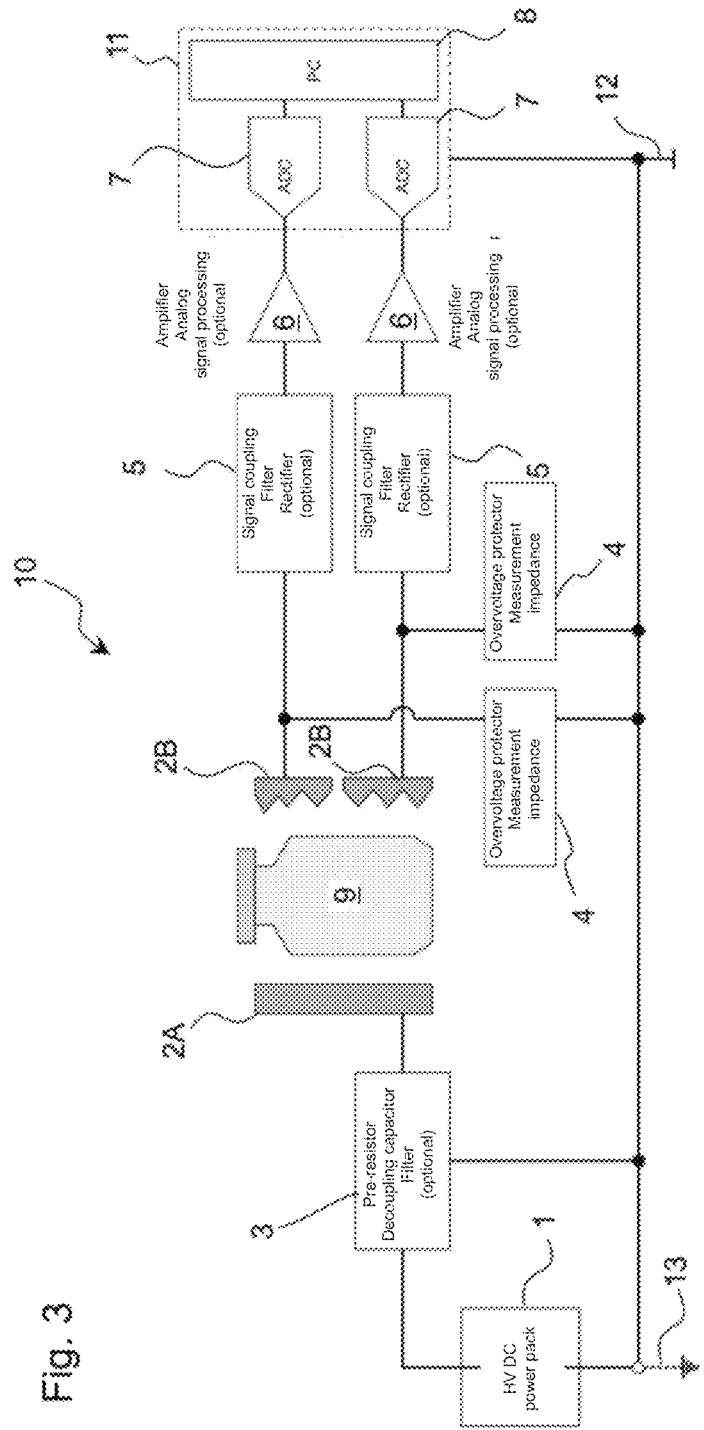
FIG. 3: a schematic representation of a device in accordance with the invention in accordance with a further embodiment.

FIG. 3 is a further embodiment of the present invention that has a high similarity to FIG. 1 in the basic design. Unlike this, however, the measurement electrode 2B is segmented into at least two mutually separate components so that a certain spatial resolution of a detected leak is possible.

If, for example, where leaks preferably occur is to be determined as part of the production of the containers, the measurement electrode 2B can be segmented to achieve a rough spatial resolution. Every electrode segment here has its own measurement channel with the described components for signal pre-processing and is read out via its own A/D converter.

An example of use for such a spatially resolved detection would be the distinction of leaks in the region of the cylindrical surfaces and in the neck/shoulder region of vials that are subject to different deformations in the course of the production from tubing glass.

It is clear to the skilled person that the multichannel solution can here naturally also be combined with the spatially resolving implementation. Since modern A/D converters as a rule have a plurality of analog inputs and since the power of current processing units here also does not represent any restriction, this does not mean any substantial cost increase.

Figure 4A:
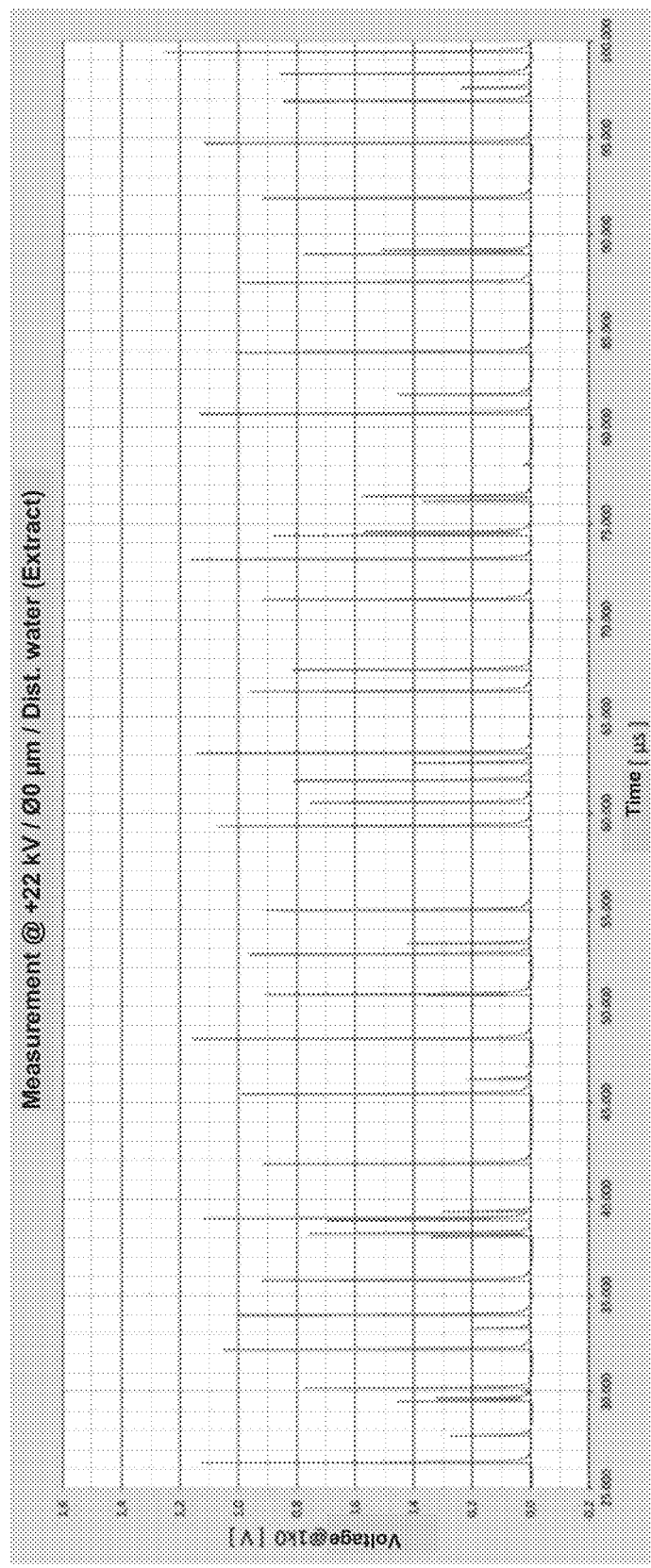
FIG. 4a: an exemplary representation of a measured signal for a leak tight container filled with distilled water.
Figure 4B:
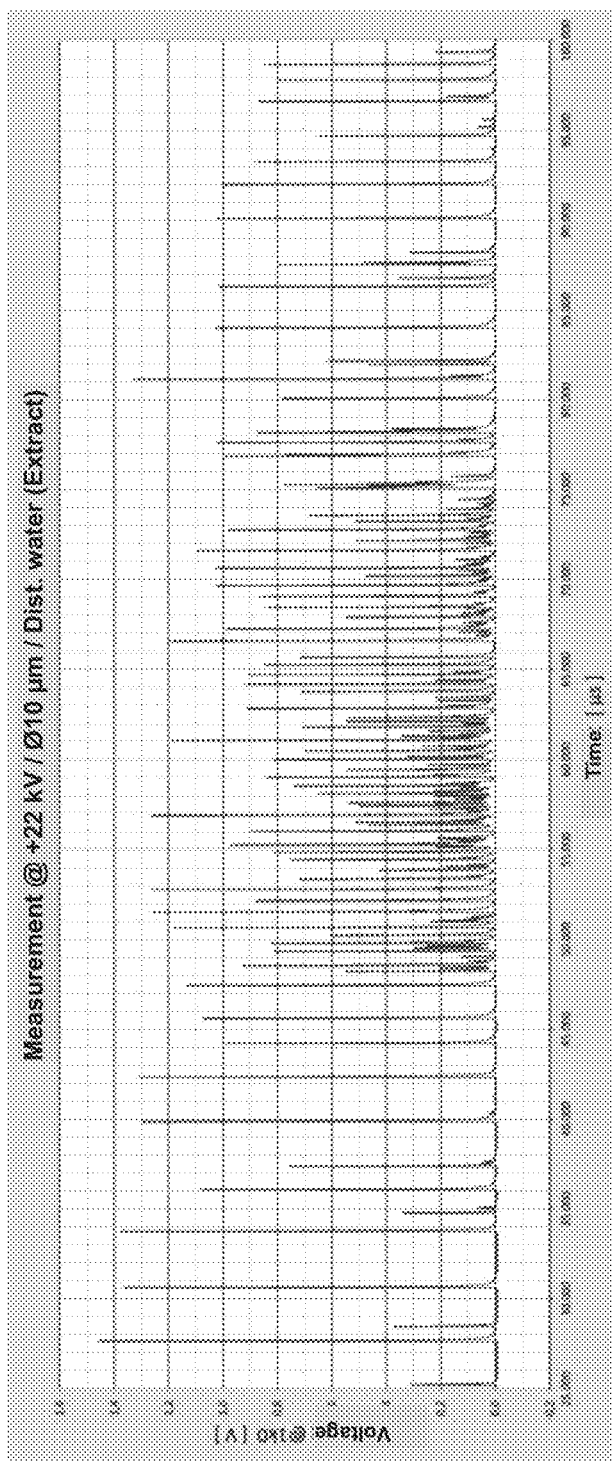
FIG. 4b: an exemplary representation of a measured signal for a leaking container filled with distilled water.

FIGS. 4a and 4b each show a detail from a measurement of the voltage signals at the measurement electrode 2B for a leak tight container (FIG. 4a) and for a container having a laser drilled hole of 10 μm diameter (FIG. 4b) with a positive voltage of +22 kV at the HV electrode 2A, measured with a pre-resistance of some MW, a measuring resistance of 1.0 kΩ and an RC filter. The mean field strength of the inhomogeneous asymmetrical E-field was at approximately 1000 V/mm. The container partially filled with distilled water was rotated. The electrode distance from the container amounted to 2 mm at both sides. The rotation and transport took place at speeds such as are typical for inspection machines (approximately 10 containers per second).

To be able to examine the total periphery of a container, all the inwardly disposed surfaces that are to be examined have to be wetted with liquid. To e.g. be able to check the side wall surfaces of rotationally symmetrical containers over a large area, they are rotated while they pass through the E-field to press the liquid onto the inner wall of the container with the aid of centrifugal force. To be able to inspect all the surfaces of a container with high reliability, provision can also be made to provide a plurality of inspection units.

With a DC voltage, no AC currents occur and—due to the high ohmic resistance of the gas line and the containers—only very low DC currents within the liquid. The container is "polarized" like its content only on its entry into the container. The containers, that consist of glass, for example, often act as additional insulators in a gas line so that the DC background actually drops with a container in the electric field. This produces small AC currents in the cycle of the container sequence.

If a voltage of sufficient amplitude is applied between two electrodes, the measured current signal displays irregularly occurring pulses whose amplitudes and densities depend on the amplitude of the electric field and—with inhomogeneous asymmetrical fields—also on the field direction (i.e. on the sign of the voltage) (cf. FIGS. 4a/b).

The container's own rotation has a further large influence: If the container is conducted past between the electrodes without any rotation of its own, it rather acts as an insulator (depending on the container material, in particular with glass). This is due to the fact that charges admittedly adhere to the insulating container surfaces, but cannot move freely thereon. Rotating containers effect a transport of particles that are also charged and are subsequently sucked off again so that the number of the pulses increases.

If they are not partial discharges in the container material, the pulses are caused by "particles" (charged or polar particles, particulates, very small droplets) that pass through the field and are "sucked off" by the electrodes.

Their origin can differ and can, for example, be due to:
electrons that are emitted by the electrodes:
electron/ion pairs that are due to the gas volume, e.g. produced by a photo effect;
particles that release from the surface of the containers;
particles that exit through the leak of the container; and/or natural radioactivity and cosmic radiation.

The invention is based on the use of a simple DC high voltage source. An electric field is generated with their aid whose exact extent can be determined by the shape of the electrodes. Homogeneous and inhomogeneous fields are conceivable depending on the kind of the container and of the container content. No other components are used for the variation of the field (switches, superposed alternating fields, . . . ).

Two basic measurement processes are thus possible using HV DC voltage. On the one hand, the detection of the comparatively high currents on lightning discharges at a leak and, on the other hand, the detection of characteristic current changes of a substantially smaller amplitude at a reduced field strength to avoid lightning sparkovers.

In the second case, the currents that also occur within the product due to the above-described current pulses are also very much smaller as long as no lightning discharge occurs.

The small currents also mean, however, that a detection of leaks via an integral current signal (smoothed by filters) is made more difficult since the difference between a defective and a leak tight container is substantially smaller, in particular with container contents having small conductivity (e.g. distilled water).

A complete recording of the current signal—before, during, and after the container passage—is advantageous so that the described leak test can fully exploit its strengths with HV DC currents. The recording can take place using fast measuring boards that are able to resolve the complex time structure of the current signal. The preferably used sampling rates are at min. 100 kSPS, preferably at 500 kSPS, and higher.

In addition, components in the signal path can be used that enable a first signal preparation and simultaneously serve the protection of the downstream measuring devices. The complete information content of the current progression is fully maintained here, however.

FIGS. 4a and 4b here show a typical signal progression on a leak test in accordance with the present invention.

With the product without a leak (FIG. 4a), individual sharp pulses can be detected with a full width half maximum of roughly 50 μs. This kind of pulse is called a Trichel pulse in the following. Its count rate amounts to approximately 1000/s. This also applies to the leaking container as long as the leak is not aligned with the electrodes.

As soon as the leak passes the HV electrode 2A due to the container's own rotation, the pulse rate 2A increases dramatically (cf. FIG. 4b). Additional pulses of smaller amplitude in particular occur that now superpose the falling flanks of the previously unimpaired pulses, but can nevertheless be reliably resolved and counted due to the very good signal to noise ratio. With this kind of configuration, the counting of the pulses—preferably selected in accordance with their amplitudes—is sufficient to distinguish leak tight and leaking products.

This increased pulse rate always appears when the hole in the rotating container passes through the field at the HV electrode 2A. The individual pulses do not represent any electric sparkovers (lightning discharges); the averagely flowing current is substantially smaller. The current amplitudes of lightning discharges would be larger than those of the Trichel pulses by a factor of 10 to 100 with said measurement resistances. A pulse generated by a lightning discharge is called a burst pulse in the following.

Figure 4C:
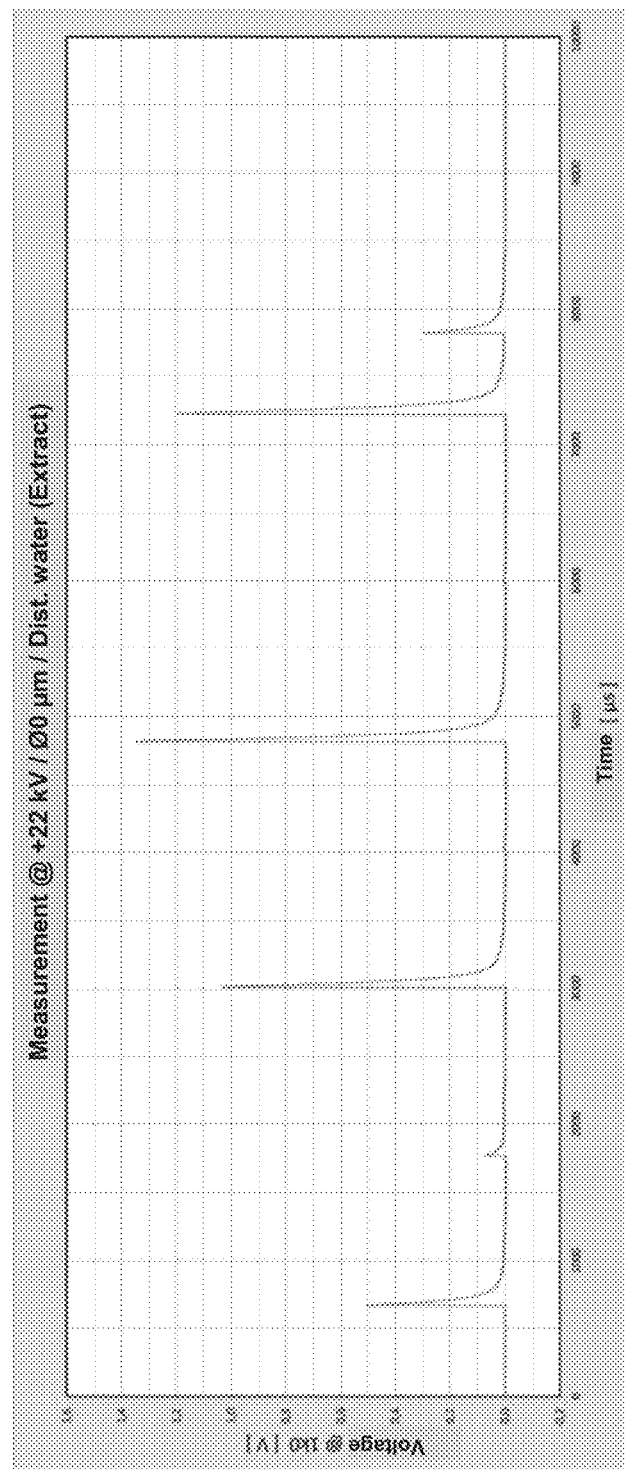
FIG. 4c: a further exemplary representation of a measured signal for a leak tight container filled with distilled water.
Figure 4D:
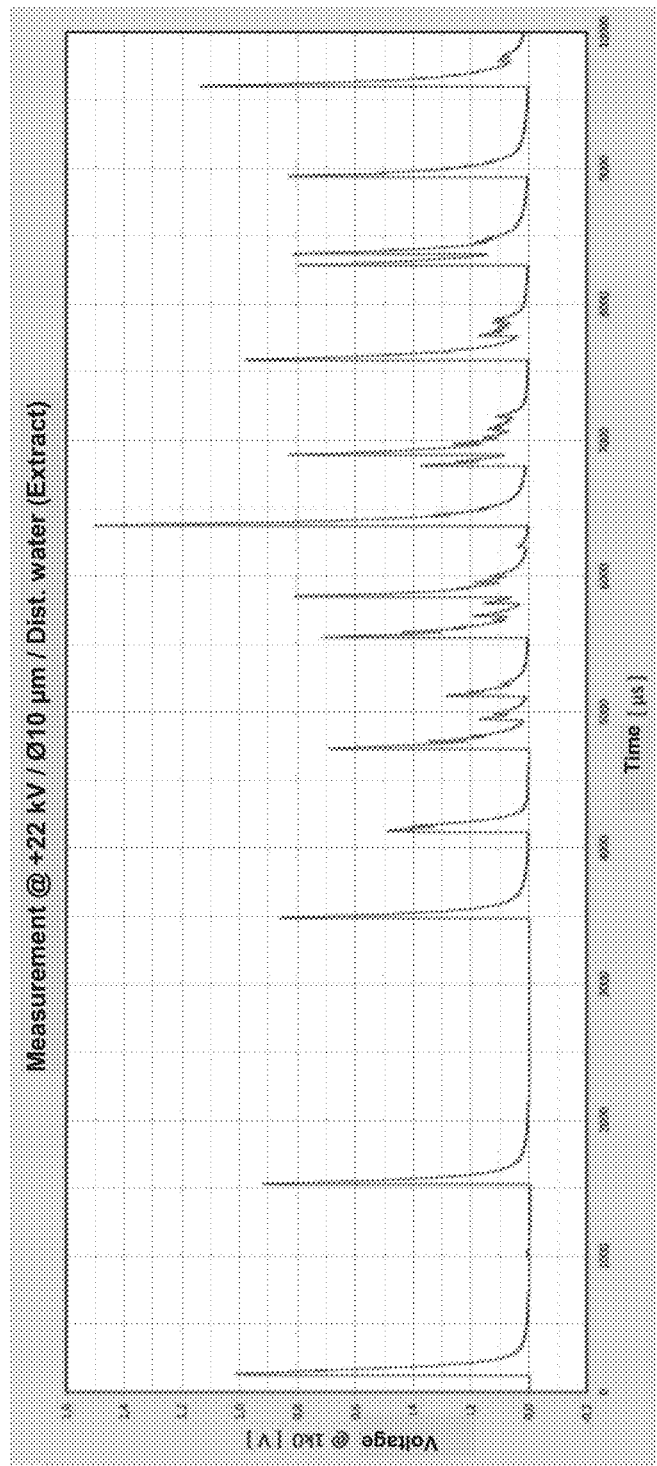
FIG. 4d: a further exemplary representation of a measured signal for a leaking container filled with distilled water.

In this respect, FIGS. 4c and 4d show representations that correspond to FIGS. 4a and 4b and that are better resolved in a temporal respect. It can also be seen here that the frequency of the pulses increases on a presence of a leak so that a conclusion can be drawn on a leaking container with reference thereto. The superposition of individual pulses also becomes clear as soon as the pulse rate increases greatly at leaking points in the container.

Figure 5:
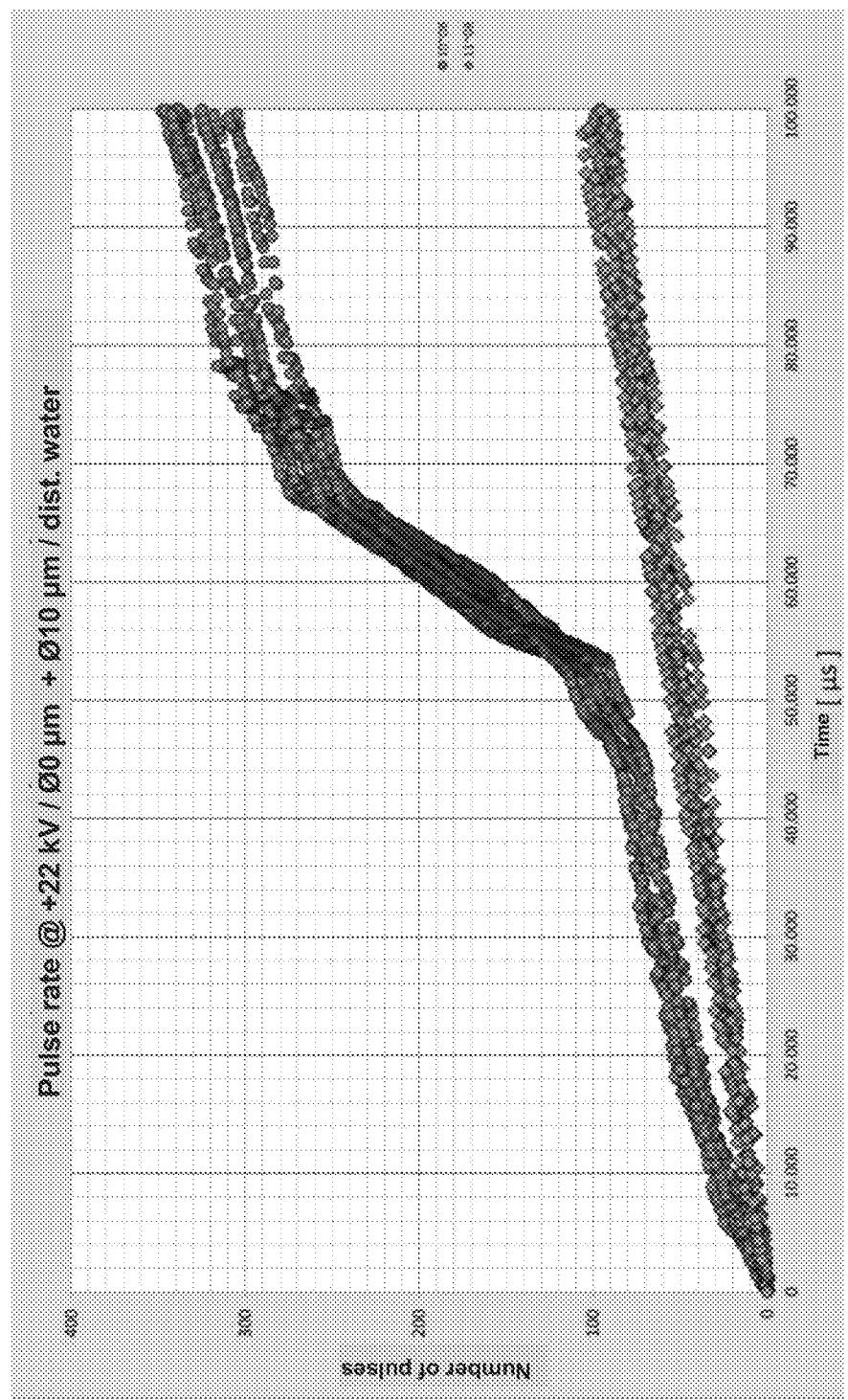
FIG. 5: an exemplary representation of an evaluation using the pulse count process based on measurement analog to FIGS. 4a and 4b.

FIG. 5 shows an evaluation of a plurality of measurements (comparable with those in FIGS. 4a and 4b) by the pulse count method while using a suitable amplitude selection. For this purpose, only those pulses are counted, for example, whose amplitude value has exceeded a specific threshold value. The number of counted pulses over time is shown during the passage (and naturally also the dwelling) of the container through the E-field.

The algorithm here recognizes and counts all the pules that are disposed within an amplitude range. The requirement is a sufficiently low noise level of the corresponding demands on the power supply and the measurement technology used.

If the leak of the rotating container passes through the zone in front of the HV electrode 2A, the count rate increases dramatically, recognizable at the step in the count rate (circular measurement points) in the time range between 50,000 and 70,000 µs. In contrast, the count rate of the leak tight containers progresses evenly in a flat manner (diamond shaped measurement points) during the whole passage. The total count rates reach a ratio of 3:1 or better between leaking and leak tight containers. The spread of the count rates for leaking and even more for leak tight containers is very much smaller so that a secure separation is ensured.

The power supply in the present case had 22 kV, the examined containers were filled with distilled water that has a conductivity of approximately 5 us and the leak in the examined leaking containers was a laser bore with a diameter of 10 µm.

Figure 6A:
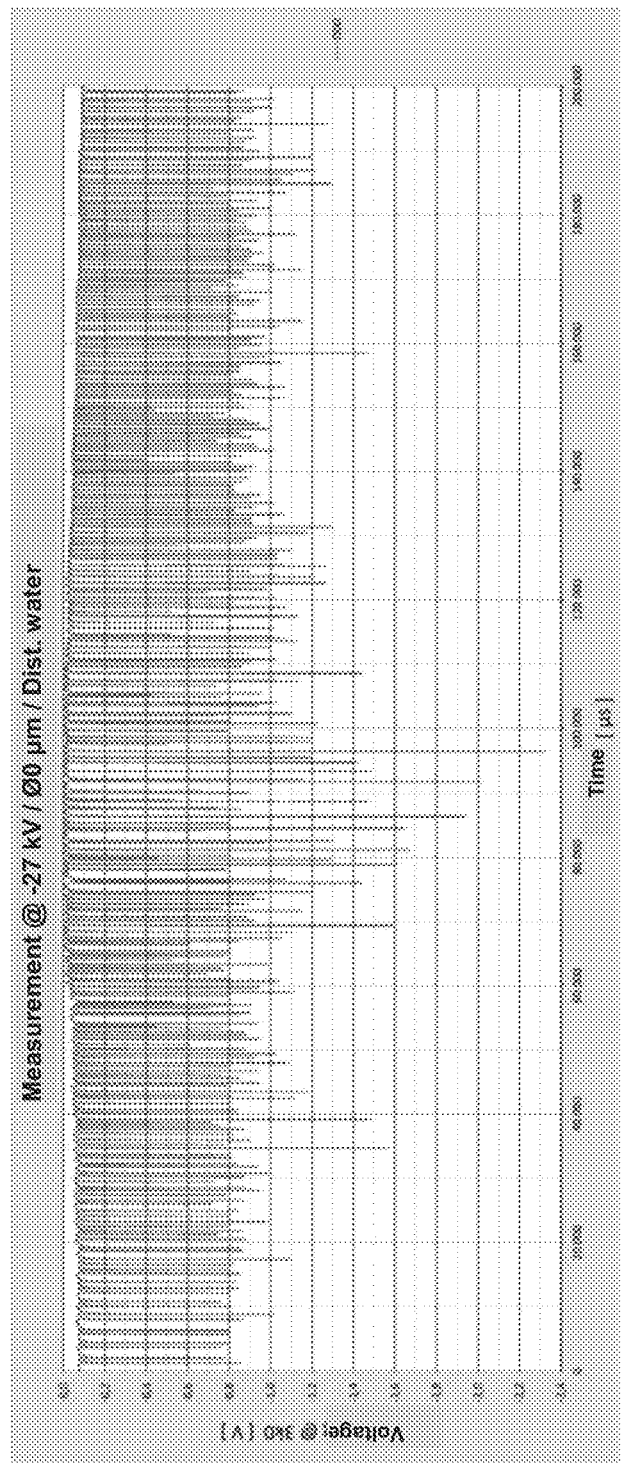
FIG. 6a: an exemplary representation of a measured signal for a leak tight container filled with distilled water and an application of a negative voltage at the measurement electrode.
Figure 6B:
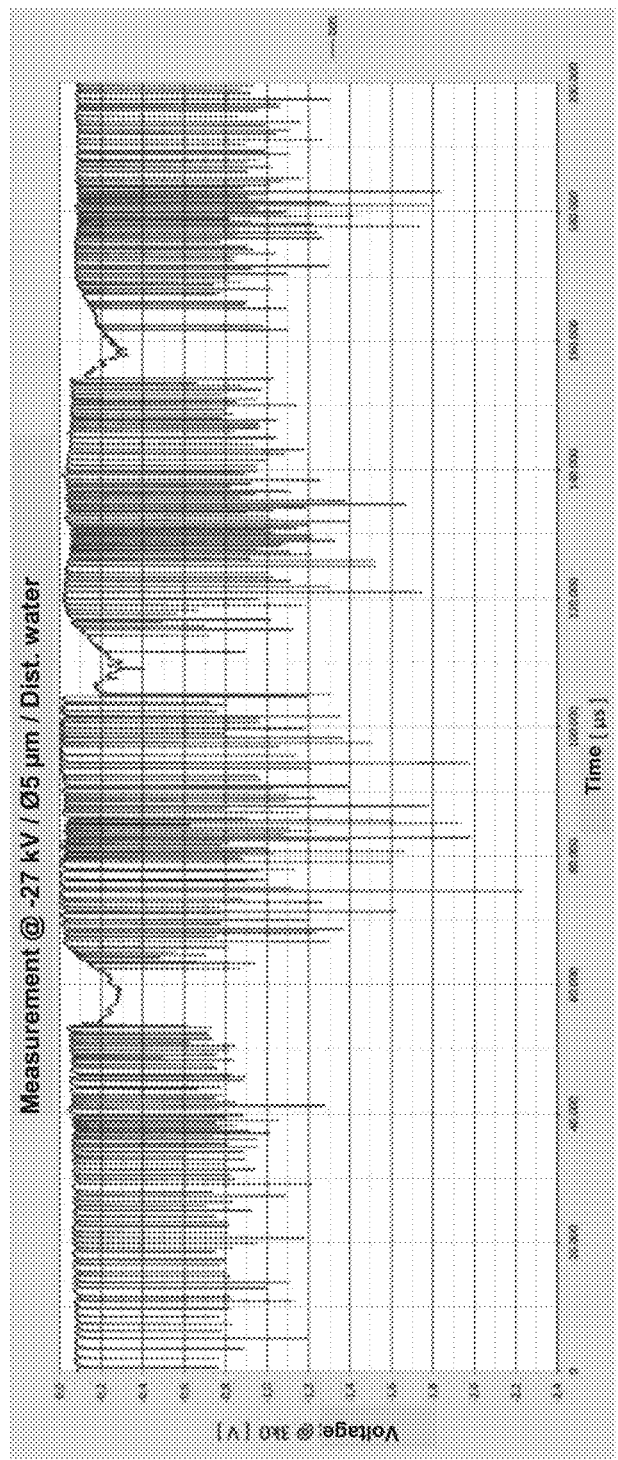
FIG. 6b: an exemplary representation of a measured signal for a leaking container filled with distilled water and an application of a negative voltage at the measurement electrode.

FIGS. 6a and 6b show measurements of the voltage signals for a leak tight container (cf. FIG. 6a) and for a container having a laser-drilled hole of 5 µm diameter (cf. FIG. 6b) with a negative voltage of −27 kV at the HV electrode 2A, measured with a measuring resistance of 3.0 kΩ and an RC filter.

The mean field strength of the inhomogeneous asymmetrical E-field was at approximately 840 V/mm. The container partially filled with distilled water was rotated. The electrode distance from the container amounted to 5 mm (!) at both sides. The rotation and transport took place at speeds such as are typical for inspection machines. The conductivity of the liquid was at approximately 5 µS (dist. water). The spectrum of the undamaged container shows a comparatively homogeneous extent, characterized by a more or less regular sequence of Trichel pulses having a full width half maximum of roughly 50 µs. A slight reduction in the background level can be recognized as soon as the container passes through the space between the electrodes since the glass container acts as an additional insulator. At the same time, the pulse rate drops slightly with the pulse amplitudes increasing. This influence on the measured signal depends on the measurement parameters, in particular from the field direction.

Striking signal changes additionally occur with the leaking container (cf. FIG. 6b). The leaks passes the HV electrode 2A every 50 ms due to the preset rotation speed; in the measurement shown at the time marks 58/108/158 ms. The changes in the signal profile become very visible at these points. The increasing number of narrow Trichel pulses "combine" to form wide pulses of lower amplitude, but a higher intensity (power) overall as long as the leak remains in the region of the HV electrode. This kind of pulse is called a leak pulse in the following.

If the leak passes the measurement electrode between these times, at 83/133/183 ms (rudimentally also already at 40 ms) in the example shown, the rate of the Trichel pulses additionally increases. The changes in the signal progression are a clear fingermark for the detection of defective containers.

Figure 7A:
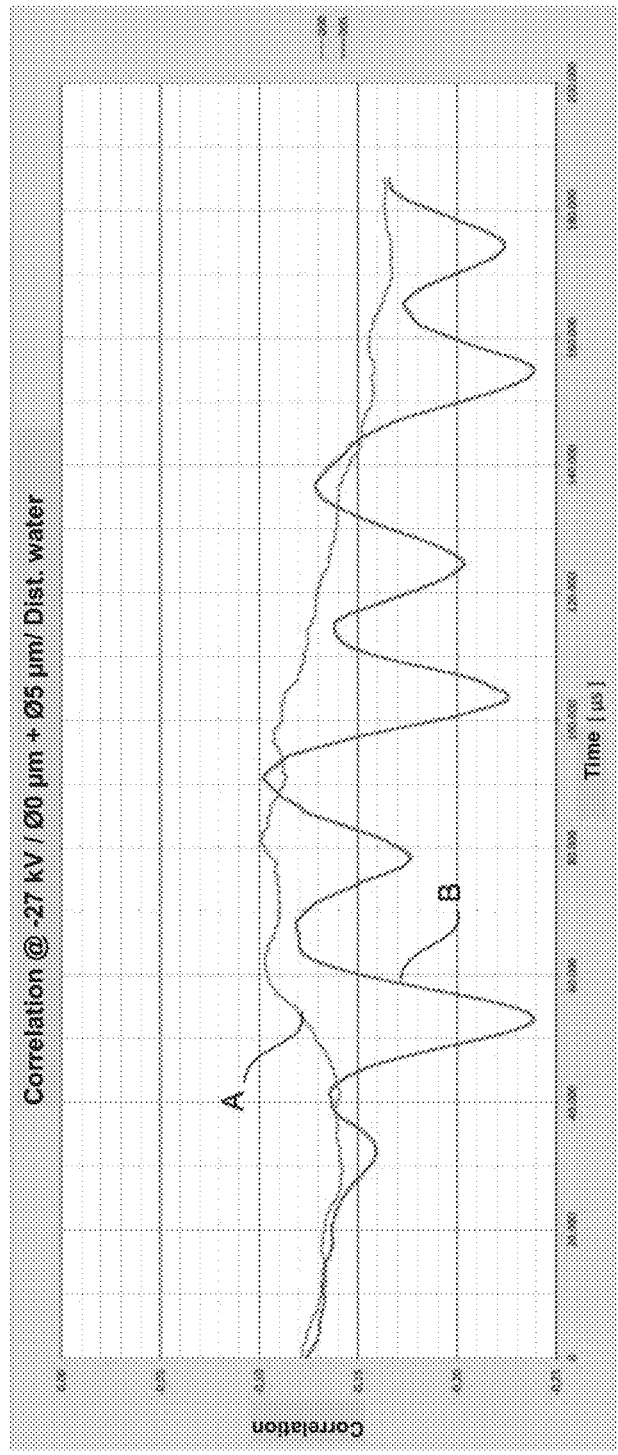
FIG. 7a: a representation of a measured signal of a leak tight container and of a leaking container further processed on the basis of FIGS. 6a and 6b in which the correlation was calculated with the aid of a simple model function.
Figure 7B:
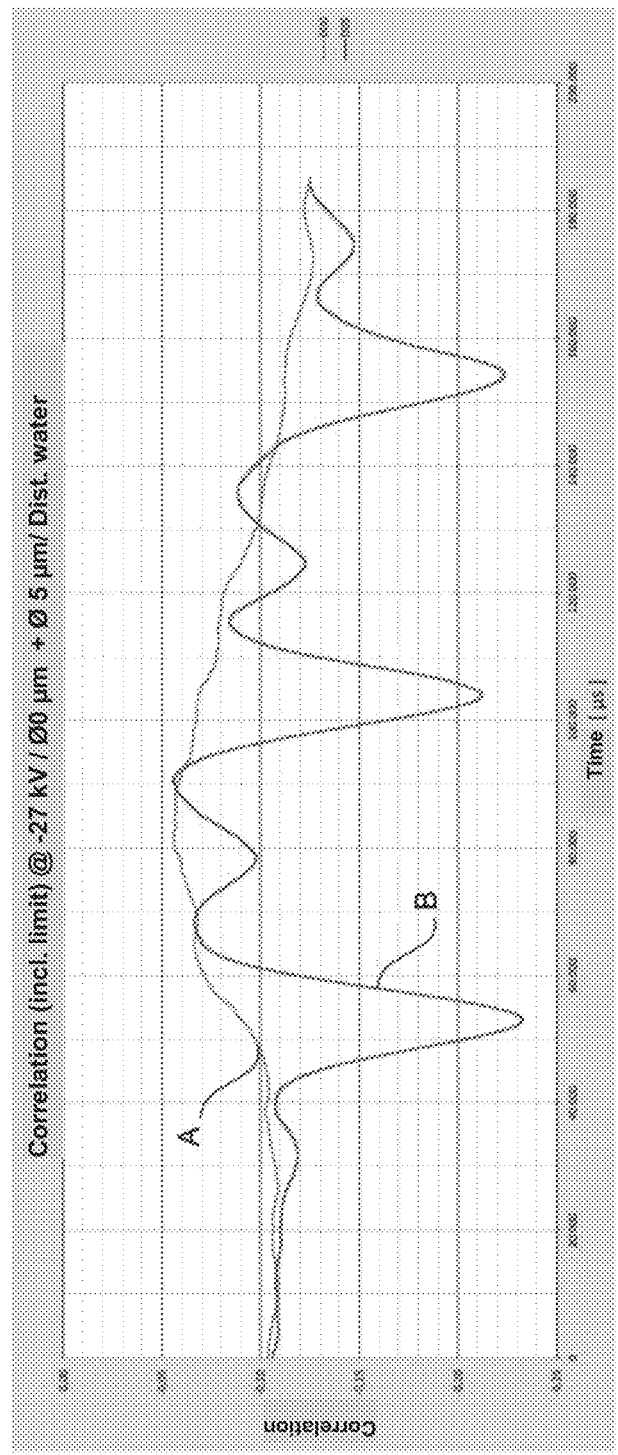
FIG. 7b: a representation of a measured signal of a leaking container and of a leak tight container further processed on the basis of FIGS. 6a and 6b in which the correlation was calculated with the aid of a simple model function, but the signal amplitude had previously been reduced to a max. if it had been exceeded.

FIGS. 7a and 7b show the result of a further evaluation method. The correlation was calculated with the aid of a suitable model function for the measurements shown in FIGS. 6a/b. The model function was optimized for the shape of the leak pulses; it is furthermore sensitive to a change of the pulse density of the Trichel pulses (if also optimized thereto) such as also occur with undamaged containers.

The curve for the undamaged reference container (reference symbol A) in both graphs shows a flat extent that roughly follows the background portion of the measured signal up to an additional offset (caused by the almost constant rate of the Trichel pulses). The curve for the leaking container (reference symbol B) shows the same background. This is always superposed by a clearly pronounced Gaussian line when the leak passes the region of an electrode. These lines will be called correlation lines in the following.

The amplitudes of these correlation lines are particularly large in the region of the HV electrode 2A, but clearly recognizable lines are also formed in the region of the measurement electrode 2B. The correlation lines appear to run ahead of the corresponding leak pulses by approximately 5 ms. This offset is caused solely by the numerical process and is of no import.

Whereas only the correlation was determined in FIG. 7a, the signal amplitude was preferably limited to a fixed value in FIG. 7b so that the larger amplitudes of the Trichel pulses are less important. This can be recognized in that the correlation lines are even more distinguished from the background due to the leak pulses while the correlation lines that are caused by the higher density of Trichel pulses are weaker. Such a limitation of the signal amplitudes can take place via an analysis program (software) or by a corresponding signal pre-processing (hardware).

Despite the very low amplitudes of the leak pulses (they are at a rough estimate a factor of 100 smaller than with electric sparkovers (lightning discharges)), the amplitudes of the correlation lines considerably exceed the level of the background. A simple limit condition is sufficient to detect leaking containers in this case due to the very good signal to noise ratio.

A further possibility of improving the measurement sensitivity comprises utilizing the periodicity of the signal-caused by the rotation of the products (provided the installation location in the inspection machine allows). Every leak can be recorded due to the lack of dead time in measurements using DC volage-independently of the rotation period and the HV frequency of an AC voltage.

Figure 8A:
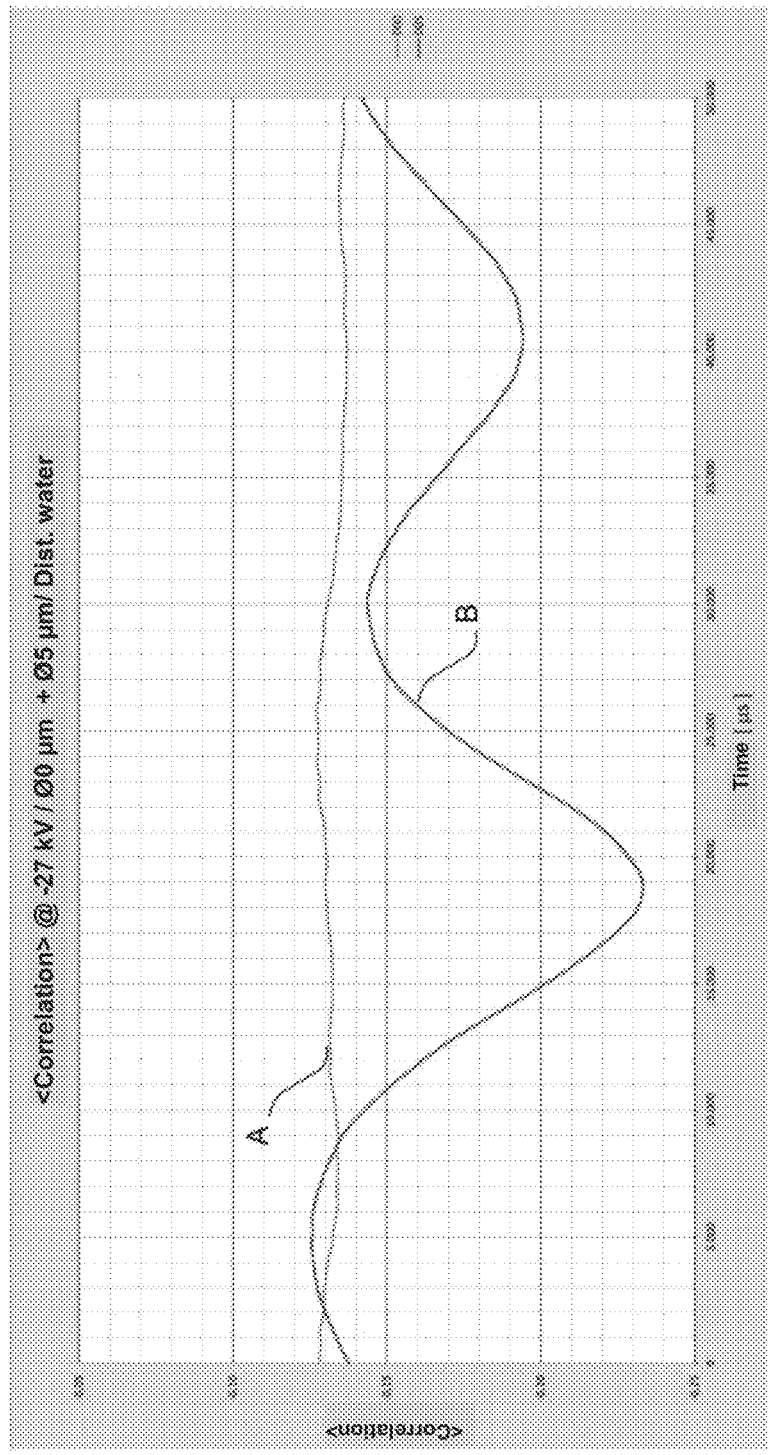
FIG. 8a: a representation of a measured signal further processed on the basis of FIG. 7a in which an averaging over three rotation periods of a rotated container has taken place.
Figure 8B:
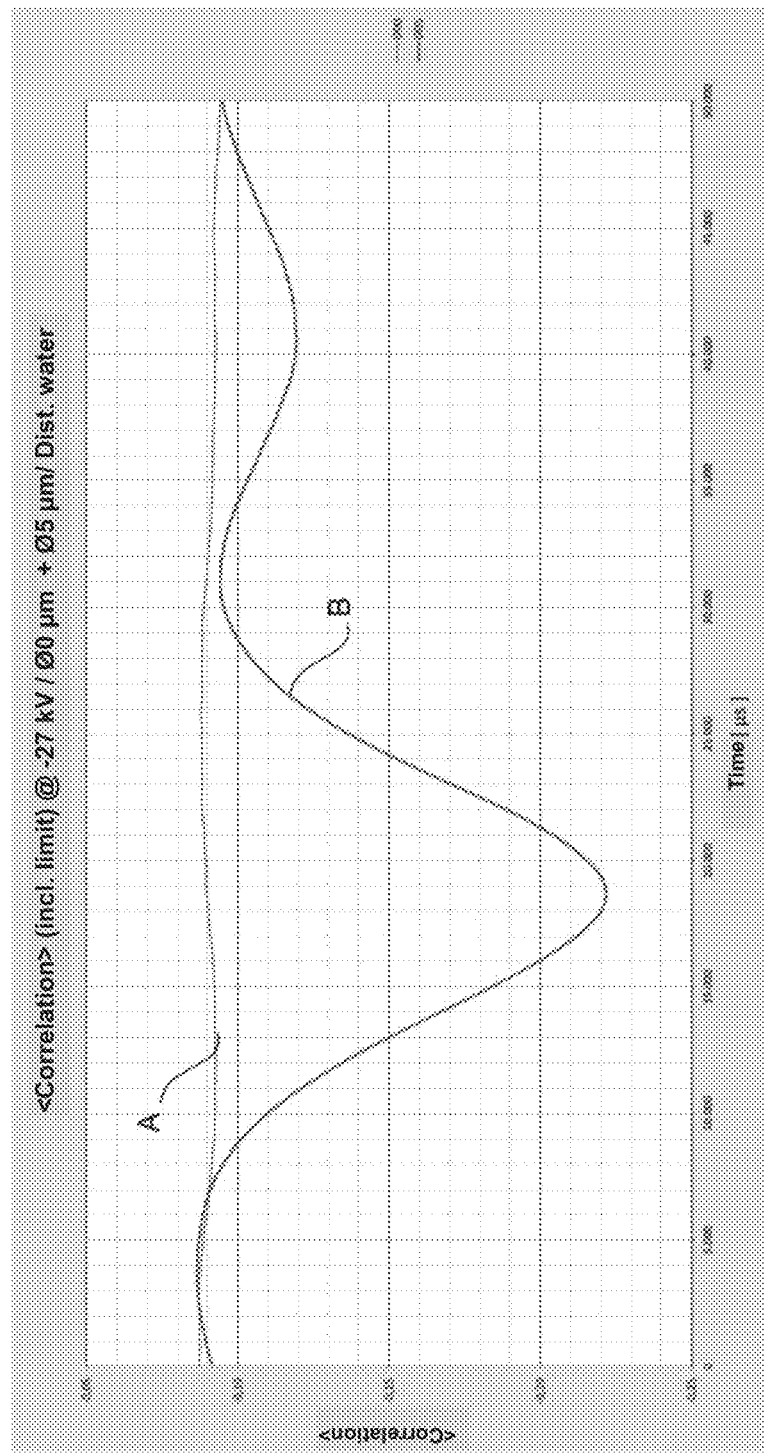
FIG. 8b: a representation of a measured signal further processed on the basis of FIG. 7b in which an averaging over three rotation periods of a rotated container has taken place.

In FIGS. 8a and 8b, the correlation line spectra shown in FIGS. 7a/b are averaged over three rotation periods as the simplest method. The extent of the background, that is roughly symmetrical to the measurement interval, is thus further smoothed for an almost constant offset, recognizable at the curves (reference symbol A) for the leak tight container. The curve (reference symbol B) for the leaking container shows the now averaged correlation lines; the passage at the HV electrode at approximately 19 ms, followed at about 41 ms for the passage at the measurement electrode.

The curves in FIG. 8a were calculated without the additional amplitude limitation, the curves in FIG. 8b with the additional amplitude limitation. A simple limit condition is again sufficient to detect leaking containers due to the again improved good signal to noise ratio and the very smooth background.

Figure 9:
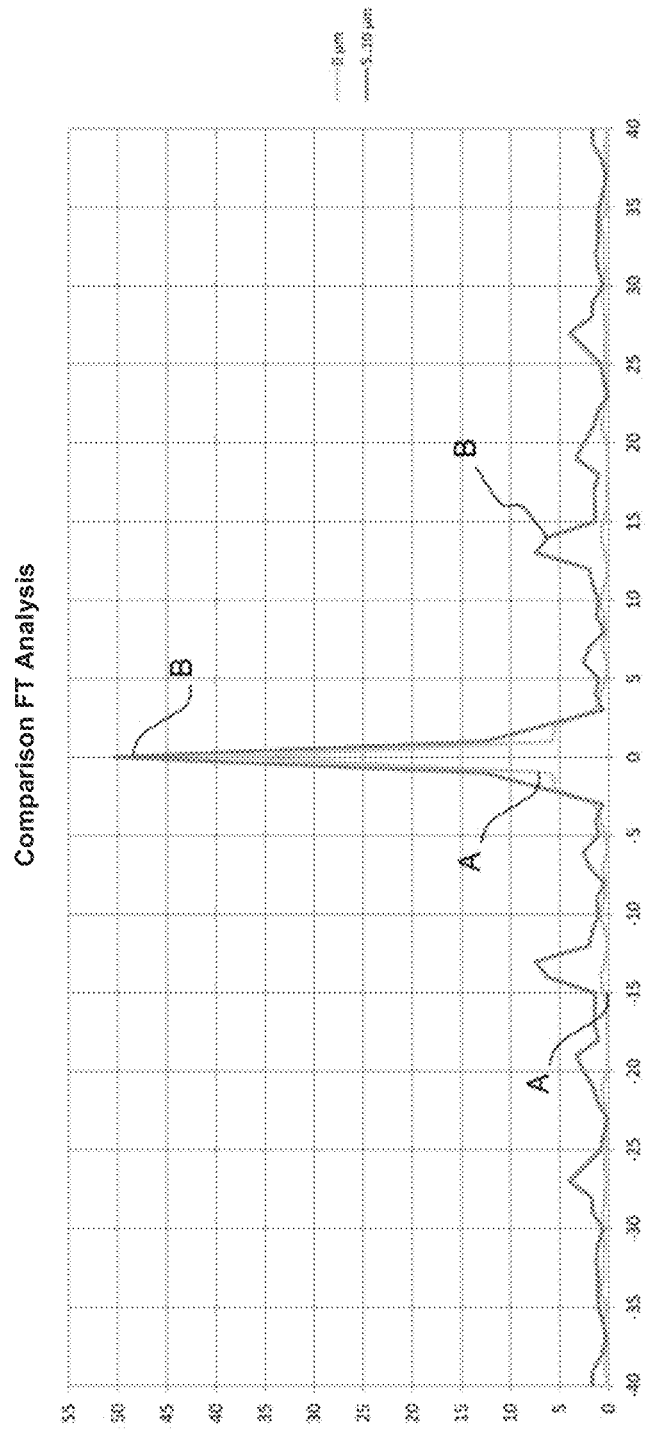
FIG. 9: a representation of a further evaluation option using the Fourier spectrum for a leak tight and a leaking container.

FIG. 9 shows a comparison of the signal progressions obtained in FIGS. 6a and 6b after a Fourier transformation. The periodicity of the leak pulses in the measured spectrum in many cases already allows a reliable separation between leak tight and leaking containers.

FIG. 9 shows, for an example, the difference of the Fourier spectrum between a leaking container with a laser drilled hole of 10 μm diameter (reference symbol B) and a leak tight container of the same type (reference numeral A) at the same measurement conditions and with distilled water as the content.

Due to the current increased on average in the leaking product, the maximum for the DC current portion admittedly also increases (line at abscissa value 0; value for B: 51; value for A: 37); however, the relative amplitude differences are considerably clearer at the abscissa values ±13. These abscissa values correspond to twice the rotational frequency of the container. These lines thus show the periodically occurring increased current flow due to the leak pulses and the increased rate of Trichel pulses, caused by the repeated passing of the laser bore (leak) at the electrodes.

However, no complete Fourier transformation is required to detect the effects in the Fourier spectrum, as shown in FIG. 9.

Figure 10:
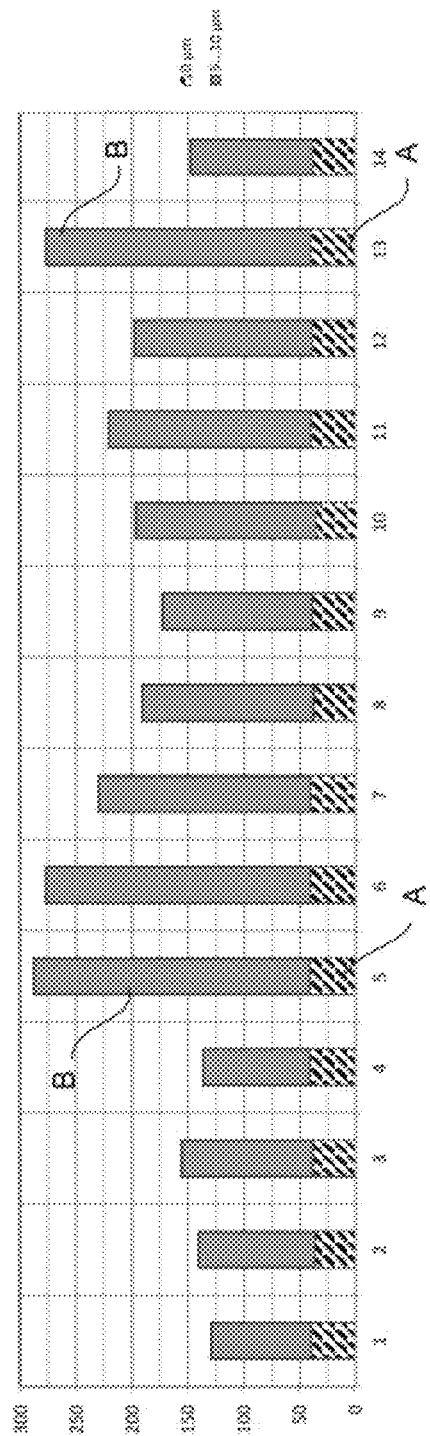
FIG. 10: a representation of the Fourier coefficients for twice the rotational frequency for a whole range of different types of leak tight and leaking containers.

FIG. 10 shows as an example the calculated amounts of the Fourier coefficients for the double rotational frequency (the preferred frequency for this kind of analysis) for a whole range of containers of different types having holes of 5 μm and 10 μm (reference symbol B) in comparison with leak tight containers (reference symbol A; shown in diagonal stripes in the FIG.), measured at different rotation speeds and also slightly different field strengths. All the containers were filled with distilled water. There is a clear gap between leak tight and leaking containers so that the distinction is possible via a simple limit value analysis.

The invention claimed is:

1. A device for a leak test of a container comprising:
   a first electrode;
   a second electrode that is arranged at a distance from the first electrode so that a space for the arrangement of the container is provided between the electrodes;
   a power supply that is adapted to apply a voltage between the first electrode and the second electrode; and
   at least one analysis unit that is adapted to analyze a current progression that is adopted on a presence of the container to be tested for its leak tightness between the first electrode and the second electrode to detect a leak tight or leaking container on the basis thereof,
   wherein
   the power supply is adapted to apply a DC voltage between the first electrode and the second electrode that is in the range from 500 V to 50 kV so that a static inhomogeneous electrical field is formed between the first and second electrodes while applying the DC voltage, and
   a device for rotating the container about an axis is provided between the first electrode and the second electrode in the space for the arrangement of the container so that the at least one analysis unit is able to analyze the current progression during a rotation of the container, during at least one rotation of the container, and wherein
   the first and second electrodes are field electrodes for generating the electrical field between the electrodes, wherein the electrodes are arranged so that when a container passes through the electrical field, a change of current flow is measured between the two electrodes with the analysis unit, and wherein the current flow is indicative for a leak of the container.

2. The device in accordance with claim 1, wherein
   the first electrode or the second electrode is connected to one of the poles of the power supply via a measurement impedance, with a positive pole being connected to the second electrode and a negative pole being connected to the first electrode via the measurement impedance; and/or
   the power supply is adapted to continuously maintain a DC voltage to be applied to the first electrode and the second electrode, with the power supply being adapted to continuously maintain the DC voltage over the test of the leak tightness of the container and in this respect with there in particular being no further components present for the variation of the electric field generated between the first electrode and the second electrode.

3. The device in accordance with claim 2, wherein there being no further components present for the variation of the electric field generated between the first electrode and the second electrode includes there being no switches, superposed alternating fields, or the like.

4. The device in accordance with claim 1, wherein the first electrode and/or the second electrode is/are configured such that the static inhomogeneous electric field is formed between the first electrode and the second electrode to generate local field strengths at the container that adopt particularly high values on an insertion of the container between the two electrodes.

5. The device in accordance with claim 1, wherein the first electrode and/or the second electrode is/are divided into at least two sections that are separated from one another to obtain a spatial resolution of any leak of the container, with each of the separated sections being conducted to the at least one analysis unit via a separate measurement channel, with the electrode divided into at least two separate sections being that electrode whose current progression is conducted to the at least one analysis unit for the analyzing.

6. The device in accordance with claim 1, wherein the at least one analysis unit is adapted to use one or more of the following evaluation processes simultaneously or consecutively:
   a pulse counting process, with an amplitude and pulse width selection;
   an interval selective integration of the current signal;
   a pulse shape analysis, with the aid of numerical processes such as the calculation of the spectral function of the current signal with the aid of the Fourier transformation, the Laplace transformation, and/or the wavelet transformation;
   the folding with different filter functions;
   the calculation of the correlation with suitable model functions (incl. autocorrelation), e.g. for recognizing bursts that only occur with defective products with correctly selected HV voltages;
   a regression analysis of the curve shapes of the correlation thus found; and/or
   an examination of the periodicity of the current changes that occur in the cycle of a rotation of the container, with a calculation of the Fourier coefficients taking place for the rotational frequency of the container and for a suitable number of multiples, in particular double this frequency, and/or with a regression analysis taking place that is based on a finite series of harmonics whose frequencies correspond to the rotational frequency of the container and to a suitable number of whole multiples, in particular the double, of this frequency;

and/or a recognition of irregular signal progressions with the aid of numerical processes or of a deep learning technology.

7. The device in accordance with claim 6, wherein the interval selective integration of the current signal is to detect a sparkover current.

8. A system for a leak test having the device in accordance with claim 1, wherein the container is positioned between the first electrode and the second electrode during a test of its leak tightness such that it contacts neither the first electrode nor the second electrode, having a distance from each of the electrodes of 0.5 mm to 5 mm.

9. The system in accordance with the preceding claim 8, further comprising a conveying device, including an inspection carousel for the container, that is adapted such that the dwell time of the container to be tested in the electrical field that can be generated in the space between the first electrode and the second electrode is no longer than 1 second.

10. The system in accordance with claim 8, wherein the container is filled with a liquid whose conductivity at 20° C. is in the range from 0.5 μS/cm to 20 mS/cm.

11. The system in accordance with claim 8, wherein the container
is largely a nonconductive or a weakly conductive material; and/or
is a flask, a vial, an ampoule, a syringe (incl. needle and needle protection), a pouch, or a cartridge; and/or
comprises a rotationally symmetrical shape.

12. The system in accordance with claim 11, wherein the largely nonconductive or the weakly conductive material is glass, ceramic materials, and/or plastic.

13. A method for a leak test of the container, using the device in accordance with claim 1, wherein in said method:
the container is led through an electric field that is formed by the first electrode and the second electrode while applying the DC voltage, including a high voltage DC voltage that is in the range from 500 V to 50 kV;
wherein the current progression at the first electrode and/or at the second electrode is analyzed to draw a conclusion on a leak tightness of the container; and
the container is rotated about its rotational axis while it is in the electric field, wherein the container is rotated about its rotational axis at a rotation speed in the range from 200-6000 r.p.m.

14. The method in accordance with the preceding claim 13, wherein, in the analysis of the container for any leak present, the focus is placed on at least one characteristic pattern in the current progression to detect a leak in the examined container.

15. The method in accordance with claim 14, wherein, in the analysis of the container,
a correlation of the current progression currently to be analyzed with a typical current progression is calculated without a leak and/or with a leak to be able to draw a conclusion on a leak in the currently examined container with reference hereto; and/or
the focus is placed on deviations in the current progression occurring corresponding to the periodicity of the rotation of the container that occur over at least two rotation periods.

16. The method in accordance with claim 13, wherein, in the analysis of the container for any leak present, the pulses in the current progression above a threshold value are looked at to be able to evaluate the leak tightness of the content with reference hereto, with
an increased pulse rate in the current progression corresponding to the periodicity of the rotation of the container being an indication of a leak in the container; and/or
a temporary lack of the pulses in the current progression corresponding to the periodicity of the container being an indication of a leak in the container.

17. The method in accordance with claim 13, wherein, in the analysis of the container,
the current progression is transitioned into the Fourier spectrum, with, on the exceeding of a threshold value of an amplitude in the range of the simple and double rotational frequency of the container, a conclusion being drawn on a leak of the container; and/or
the contributions of the Fourier coefficients are calculated for twice the rotational frequency of the container and/or of a whole number multiple thereof and, on an exceeding of a threshold value of the contributions at these points, a conclusion is drawn on a leaking container.

* * * * *